Patented Sept. 2, 1952

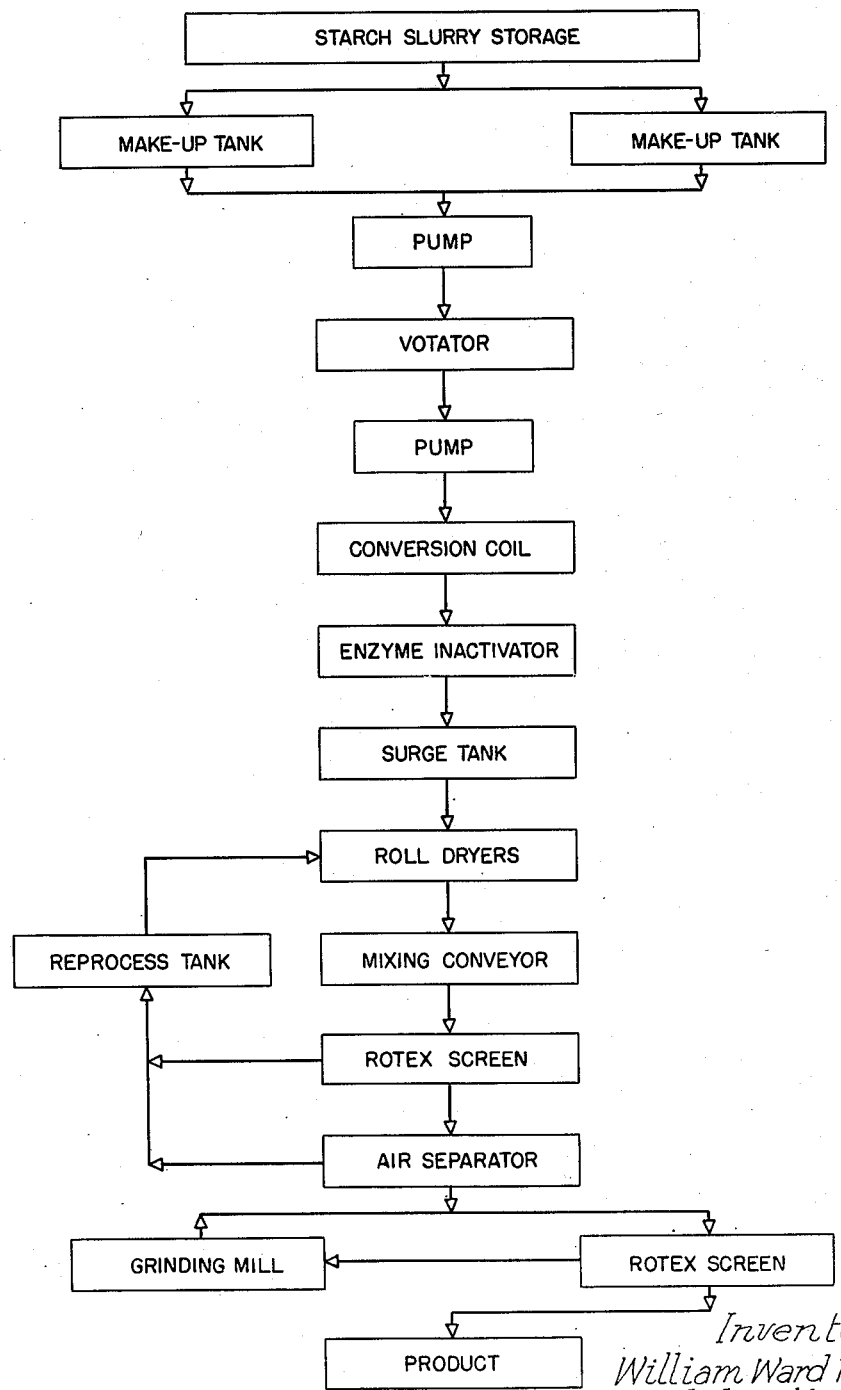

2,609,326

UNITED STATES PATENT OFFICE 2,609,326

COLD WATER DISPERSIBLE STARCH PRODUCT AND METHOD OF PREPARING THE SAME

William Ward Pigman, Appleton, Wis., Ralph W. Kerr, Riverside, and Norbert F. Schink, River Forest, Ill., assignors to Corn Products Refining Company, New York, N. Y., a corporation of New Jersey Application May 21, 1948, Serial No. 28,416

15 Claims. (Cl. 195—31)

The present invention relates, generally, to instantly dispersible, cold water soluble, laundry starch, and methods of making the same.

It has long been recognized that a need exists for a laundry starch product in dry form which is instantly dispersible and readily soluble in cold water to form a liquid size having sizing strength at least substantially equal to that of cooked laundry starches which have long been widely used. In order to meet with success, such a cold water dispersible and soluble laundry starch must be produced at a cost at which it can be sold in competition with laundry starch products now on the market.

However, despite the long and apparent need for such a cold water dispersible product, there have been many attendant difficulties and problems which appear to have prevented the provision of such a product on a commercial basis.

The object of the present invention, generally stated, is the provision, on a commercial basis, of an instantly dispersible and cold water soluble laundry starch in dry form having sizing properties at least substantially as good as those exhibited by cooked laundry starch.

An important object of the invention is the provision of a commercial process for producing cold water dispersible and soluble laundry starch in dry form which, in comparable concentrations, affords sizing mixtures at least substantially equivalent to those prepared from cooked laundry starch.

An important object of the invention is the provision of a cold water dispersible, cold water soluble, laundry starch, and satisfactory methods of producing the same, which product is characterized by its uniform content of modified or fractionated starch molecules having excellent sizing properties, and its freedom from hydrolysis products, such as reducing sugars, which have poor sizing properties, and also characterized by its freedom from appreciable content of molecular aggregates which are not readily dispersible in cold water or which settle out readily therefrom.

Another object of the invention is the provision of a process for the partial hydrolysis of starch to the level where good sizing ability is retained by the modified molecules and the characteristic property of staining blue with iodine is retained, and yet when the hydrolyzate is dried, the product is readily redispersible in cold water to form a stable sol.

Another object of the invention is the provision of a commercial process for producing cold water dispersible and cold water soluble laundry starch wherein through a combination of (1) gelatinization and dispersion of starch granules in a relatively short time under a high degree of agitation and shearing action in excess of that required for uniform blending followed by (2) enzymic conversion with certain starch-liquefying, hydrolytic amylases characterized by their ability to break starch molecules into large fragments as distinguished from relatively low molecular weight end fractions, the natural starch molecules are uniformly hydrolyzed so as to produce a product having substantially lower average molecular weight than the ungelatinized starch, but in which the major fraction of the constituent molecules in the hydrolyzate is within a relatively narrow range wherein good sizing action is retained.

Another object of the invention is the provision of the cold water dispersible and cold water soluble laundry starch in dry form, and a commercial process of producing the same, wherein a starch-liquefying, hydrolytic amylase acts upon gelatinized starch under vigorous agitation, so as to hydrolyze the natural starch molecules and modify the same so that the final product, particularly when corn starch is the native starch material used, contains linear polymers precipitable with "Pentasol" (proprietary name for commercial mixtures of amyl alcohols) in a much lower relative proportion than in the natural product.

Another object of the invention is the provision of a method for producing cold water dispersible laundry starch which involves enzymatic modification of starch followed by immediate drying.

Still another important object of the invention is the provision of a method of producing cold water dispersible laundry starch which involves enzymatic modification of starch wherein a calcium ion supplying substance is used to enhance the activity of the enzymes.

Other objects of the invention will in part be obvious and will in part appear hereinafter.

For a more complete understanding of the nature and scope of the invention, reference may be had to the following detailed description thereof wherein several methods of producing products in accordance with the invention are set forth by way of illustration.

The accompanying drawing contains a flow sheet of a presently preferred commercial embodiment of the invention.

Before proceeding to a detailed description of specific embodiments of the invention, it will be helpful to a proper understanding thereof first to give a brief outline of the best current understanding of the nature of the sizing action of laundry starch, and of the starch chemistry which our invention involves.

Textile sizes used in laundry work or textile finishing are employed primarily to improve the body or "hand" of the fabric and to protect the fibers with a film of size against wear and to impede the penetration of soil or dirt into the fabric, thus facilitating cleaning or laundering. Modified starches, when thoroughly gelatinized by cooking in water, are admirably suited for textile sizing and have been used extensively for this purpose in the past.

Such modified starches are generally prepared by partially hydrolyzing native starches by the action of mineral acids, the modification being controlled by neutralization.

Native starches such as corn, wheat, and rice, cooked in water, may be used as such in special instances when considerable body or stiffness is to be imparted by the size. The sizes prepared from such native starches are such that the starch paste collects mainly on the exterior surfaces of the fabric with little penetration into the yarns or fibers, because of the great size of the starch aggregates, or molecules in the starch size, and a stiff, boardlike finish results. However, in the majority of textile sizing operations, some penetration of the size into the yarns is desirable, leaving a limited amount of size on the surface so that the body of the fabric will be improved and at the same time the fabric will present a flexible and more natural appearance. This result may be accomplished by degrading the starch to a limited extent, such as, for example, by hydrolytic scission of the molecular units in the starch, so that smaller aggregates will result when the size is prepared. Thus, many of the well known commercial laundry starches are prepared industrially by subjecting the starch in the ungelatinized state to the hydrolytic action of dilute acid followed by neutralization, washing, and drying of the product. From this, the laundry worker or textile sizing operator prepares his size by cooking or gelatinizing the starch in water by heating it.

In some large industrial operations, the size maker may prefer to modify the starch himself. In such instances he may gelatinize the starch in water by suitable cooking and partially degrade the starch by the addition of hydrolytic enzymes. These enzymes are of the class called amylases. The sizes so prepared are then utilized directly without drying.

If, in the modification of the starch, either through the action of acids or amylases, the degradation or break down of the molecules is carried beyond a certain level, the starch units become too small, and excessive penetration into the yarns results, leaving little or no protecting film of the size on the surface. In such instances, the sized fabric does not possess the desired body or the desired degree of stiffness. Furthermore, such over-degraded products contain excessive proportions of sugars, which are the end products of starch hydrolysis, and when such sizes are applied to fabrics, they may cause an undue amount of sticking when the sized fabric is finished with hot irons.

Modification of the starch for the sizing operation intended, must, therefore, be carefully controlled. In addition, proper application of the starch depends also upon the mode of preparing the size. If the starch is undercooked, an effect similar to insufficient modification of the starch may result. If cooking is too extended, the starch may continue to degenerate beyond the desired level. And, if the size is prepared under conditions which favor a reassociation of molecular units into larger physical aggregates, (e. g. prolonged standing at low temperatures), local oversizing or uneven sizing in the fabric will follow and will detract considerably from its "hand" and appearance. When this latter condition in a size prevails, as it frequently does in practice, corrective measures, such as passing the size through a sieve just before use, are resorted to but these measures are not entirely satisfactory and are poor substitutes for proper technique in preparing the size.

Accordingly, it will be seen that at the present time, the preparation of suitable textile sizes from starch requires careful control of many steps in the operation, and if correctly performed, it is an involved and time consuming process. Obviously, the ideal and highly desirable solution to the problem would be the provision of a starch product wherein the natural molecular units have been decreased in size with a high degree of uniformity to the proper level whereat the molecules retain their normal sizing ability and yet the product will be freely and readily dispersible in cold water and will dissolve to form a stable colloidal solution of proper particle size without the necessity for cooking or heating. Those starch products which have been heretofore provided having suitable solubility characteristics in cold water have yielded sols which are too weak with respect to sizing strength, presumably because of excessive reduction in the size of the molecular starch units required to obtain adequate water solubility by the methods of starch modification employed.

Another undesirable characteristic of these previous highly soluble products is the very poor manner in which they wet out and disperse in water; these materials ball up and form clumps when mixed with water and require prolonged stirring in order to obtain a uniform dispersion.

A further difficulty which has attended the production of cold water dispersible and cold water soluble starch products has been the fact that although the physical units comprising the starch granule may be completely disrupted during the manufacture, the starch molecules and aggregates tend to reassociate so as to form larger colloidal units, during the period of drying. Therefore, even though starch units may be completely dispersed during manufacture, and even though the molecular constituents may have been reduced in size to a satisfactory level, both in respect to solubility and sizing characteristics, this processing may be largely undone during subsequent manufacturing operations if reassociations and reaggregations take place to such an extent that the end product contains colloidal units so large that they cannot freely redisperse or redissolve in water.

Because of the above difficulties, a preferred procedure resorted to in the past in producing cold water dispersible starch products, has been to modify the starch to an excessive extent relying on the fact that when starch molecules are so reduced to a small size, either they are no longer capable of reassociation, or the rate of reassociation is such that unduly large aggregates will not have an opportunity to form during the final manufacturing stages, including drying. In this connection, inasmuch as most native starches are stained blue with iodine, and inasmuch as a general decrease in the size of starch molecules parallels a loss in the ability of the product to stain a blue color with iodine, many size producers have purposely converted the starch to a level where the product no longer gives the characteristic starch-iodine test. In proceeding along this line, the assumption is followed that if all of the molecules which are long or large enough to give a blue color are broken down into shorter lengths, e. g., into the range of molecular sizes arbitrarily termed dextrins which give a reddish to yellow color with iodine, then the product will disperse more freely and dissolve more completely in water. The inherent weakness in the sizing strength of the resulting products can in some measure be balanced by using an increased ratio of starch size to fabric. However, the results are not completely satisfactory and this practice results in a very inefficient and uneconomical use of starch size.

The reassociations between modified starch molecules which detract from their ability to redisperse and redissolve in water appear to be dependent upon a number of factors including the average size of the molecules, the structure of the molecules, the distribution between the two types of molecules normally present in starch, the size range of the molecules, particularly the type of molecules which readily associate, and to some extent on the size distribution within the two types. Apparently, a given proportion of molecules having the correct size and structure for maximum reassociation can by their presence induce an aggregating effect in a mixture of starch molecules far out of proportion to their actual number ratio. These are the linear starch molecules, which will be discussed in some detail, later.

The starch molecules of native starch are closely bound together in the starch granules, a state which gives them considerable protection against destructive agencies such as enzymes and acids. Some molecules, or some parts of molecules, are less firmly bound than others. Therefore, in normal procedures for modifying starch the less firmly bound and more readily dispersed molecules will be the first to be attacked by the modifying agent, whereas the rate of attack on highly associated molecules (which also have a pronounced tendency to reassociate) will be very low in comparison. Consequently, the normal result of this non-uniform modification in the size of the starch molecules is that by the time all of the molecules are reduced below the level where they will give a starch-iodine test and will not readily reform into insoluble aggregates, many other of the molecules will have been reduced far below the size range where they are effective textile sizing agents. Accordingly, the resulting size product has a low efficiency or sizing power and a high content of reducing dextrins which are objectionable in sizing compositions when present in amounts above a few per cent, e. g., 6-7%.

Different starch modifying or converting agents act in widely different ways upon the starch molecules. Acids break available starch molecules at random points, that is, at random glycoside linkages, in the structure so that at any point during hydrolysis there is a very wide range of molecular sizes. In addition to being attacked by acids, starch molecules are also subject to attack by the hydrolytic amylases, which are classified into two general types, i. e. alpha-amylase and beta-amylase. Beta-amylase, which is characterized as being of the so-called saccharifying type, hydrolyzes starch solely by breaking off sugar molecules, such as maltose. In contrast to the action of beta-amylases, the alpha-amylases, characterized as the dextrinizing or liquefying type, act to decrease the size of the starch molecules by breaking off relatively much larger fractions or units. Thus, for the production of a starch size which is to be uniformly converted into a product consisting of molecular species which have narrow ranges of molecular sizes, it is obvious that the alpha-amylases are, as a class, a better source of enzyme for this purpose than are other hydrolytic agents such as acids or the beta-amylases.

However, even among the alpha-amylases there is a marked difference in the molecular size distribution in the hydrolyzate when starch is hydrolyzed under ideal conditions, depending upon the source of type of the alpha-amylase. Enzymes of the *Bacillus subtilis* type are the alpha-amylases of choice for the purpose of this invention since they give a very narrow range of distribution of molecular sizes when starch is hydrolyzed in accordance with the process provided by the present invention.

As will appear more fully hereinafter, cereal alpha-amylases may be used in accordance with the invention in connection with certain types of starches, e. g., tapioca starch.

The common starches are physical mixtures of two species of molecules which differ both in their structure and size. For example, in corn starch about 25% to 30% of the weight is composed of linear, thread-like molecules containing between 100 and 600 glucose units in their structure and having a number average of about 400 to 600. The balance of the molecules in corn starch, i. e., 70% to 75%, is composed of branched molecules, having a thousand or several thousand glucose units in their structure. It is known that although the longer branches on the ramified molecules can, on occasion, associate to a limited extent so as to form less readily dispersible aggregates, the ability of the linear, thread-like molecules so as to associate is enormous in comparison. Furthermore, the rate and completeness with which linear starch molecules associate into aggregates which are sufficiently large to be insoluble and difficultly dispersible in water is a function of chain lengths, since below a certain chain length the aggregational effects are small.

We now know that the characteristic property of whole starch pastes to form irreversible gels, and on standing and dehydration to form non-dispersible and water insoluble aggregates, is due primarily to the presence of the thread-like molecules in sufficient amounts and having the length requisite for associations. Branched molecules, particularly those in the native state, and containing long branches, contribute to these effects in that by their presence in large numbers they materially increase the opportunity for linear molecules to associate with other linear units, in this case linear sections of branched molecules. However, when these linear molecules are absent, such as when they are removed in a fractionation procedure, the associative tendency of the branched molecules is small.

In view of the above nature and structure of starch molecules, in the modification of starch so as to reduce the size of the starch units to the proper level for good sizing characteristics, and so to alter the composition of the starch in respect to its two components, so as to provide a modified starch which is relatively stable with respect to reassociations and which can be dehydrated into a powder which will freely disperse and dissolve in water, it is essential that a large proportion of the linear molecules be reduced in length below the range where reassociations occur to a very material degree. Modifications of the branched starch molecules is also necessary to improve its sizing properties, but while this is being effected, the modification must proceed uniformly throughout all of the starch molecules, particularly in respect to the linear constituents, if the product is to retain its water solubility and dispersibility after dehydration.

Accordingly, it will be seen that the ideal modification of starch for production of a cold water dispersible laundry starch is one in which the starch granules are broken down uniformly in such a way that nearly all of the constituent molecules are equally available for attack and modification by an agent which breaks or splits the molecules into large fractions of relatively narrow size range, as distinguished from random sized molecular fractions including a substantial proportion of reducing dextrins and sugars, with the modification procedure being controlled so that it may be terminated when the starch molecules have been broken to an extent such that they are readily redispersible from a dehydrated product without tendency to reassociate, and yet not so small as to have lost their natural sizing properties, to any material extent. In accordance with the present invention, a method of modifying starch has been provided in which the above ideal conditions are at least very closely approached, if not actually completely realized, by (1) gelatinizing and dispersing starch granules in a short time while subjected to intense agitation and shearing action, followed immediately by (2) enzyme converting the thus gelatinized and dispersed starch with a starch-liquefying amylase characterized by its ability to break starch molecules into large fragments as distinguished from relatively low molecular weight and fractions and by (3) drying the thus treated starch, preferably immediately after treatment. Additional processing conditions and techniques, such as proper concentrations, acidities, temperatures, time and additional materials, must be followed for satisfactory results.

When the process provided by the present invention is properly carried out, it is practical to produce on a commercial scale a cold water soluble laundry starch in dry or powder form, which is readily and rapidly dispersible in the usual sizing concentrations, in water at room temperature. In comparable concentrations, the sizes produced from such cold water dispersible laundry starch have a sizing power or efficiency comparable to that of ordinary cooked laundry starch. No more than 10% by weight of the dry product will settle out from the cold water dispersions in an hour, and for practical purposes such a size can be considered to have adequate water dispersion stability.

In addition to the above performance characteristics of products made in accordance with the process of this invention, such products are further characterized in that they give the characteristic blue staining test for starch with iodine. It is also readily determinable that the products have been given a modification treatment and the molecular characteristics altered from the fact that the products, particularly those made from corn starch, give a precipitate with "Pentasol" which is usually considerably less than the normal precipitate for native starch and acid-modified starch. Thus, corn starch modified in accordance with the present invention gives a precipitate with "Pentasol" of about 11.5% by weight whereas native corn starch and ordinary modified corn starch gives a precipitate of 25-30% with "Pentasol."

The products of the invention are further characterized by the absence, or at least the very low content of reducing dextrins and sugars, which are usually reported together as reducing sugars. Products having a reducing sugars content of about 3% are satisfactory, but a lower value of about 1% or less is preferred. The products of the invention have certain other characteristic properties which distinguish them from other modified starch products.

It has been found that the addition of a small amount, e. g., approximately 5% by weight dry basis, of boric acid, or some substance which will yield boric acid, as for example borax, to the product of the invention at some point prior to dehydration thereof, affords laundry starch, the mixing characteristics of which with cold water are improved. At present, this is believed to be due to the effect of boric acid in the drying operation in controlling the bulk density of the dry product, since when the boric acid is left out, the product occupies a larger volume per unit weight and is accordingly less readily re-wet with a given volume of water.

Reference may now be had to the accompanying drawing and to the flow sheet contained thereon for a description of one specific embodiment of the invention, after which a number of modifications and variations will be discussed, and pertinent experimental and test data will be given.

EXAMPLE 1

Because of its industrial importance and availability corn starch is the preferred starch material for the process, although as will appear hereinafter, known starches from other sources are in general suitable. Regular silk-screened, double washed, unmodified process corn starch slurried in softened water, is the preferred source of starch for the process. Such a starch slurry is delivered into a make-up tank (preferably provided in duplicate), and there is added 0.1 per cent of commercial calcium chloride which enhances the activity of the enzyme. The gravity of the starch is adjusted to 17° Baumé and the pH is raised to 6.5 by the addition of soda ash. Thereafter, 7.5 per cent boric acid and 0.4 per cent enzyme ("Rhozyme DX," proprietary name of the Rohm & Haas Company of Philadelphia, Pa., for a commercial enzyme preparation derived from a group of thermophylic bacteria of which *Bacillus mesentericus* and *Bacillus subtilis* are members and which are starch-liquefying heat-resistant, hydrolytic amylases) are added to the slurry. The pH adjustment should be made before the addition of the boric acid. The weights of the additions are calculated on the dry starch basis. The quantity of enzyme necessary to obtain the desired conversion will probably depend primarily upon the quality of the starch slurry. A gallon of the batch prepared in this manner will have the following composition:

|  | Pounds dry substance |
|---|---|
| 1 gallon 17 Bé. starch contains | 2.851 |
| 7.5 per cent boric acid | .2135 |
| 0.4 per cent enzyme | .0114 |
| 0.1 per cent soda ash | .0029 |
| 0.1 per cent calcium chloride | .0029 |
| Total dry substance per gallon slurry | 3.0817 |

7.5 per cent moisture in dry product, 0.2498 lb. water.
Total lb. product per gallon slurry, 3.3315

The prepared slurry from one of the make-up tanks is withdrawn by a suitable pump and delivered at a constant rate into a Votator, a known type of heat exchanger supplied by the Girdler Corporation of Louisville, Kentucky. In order to observe and control the rate of flow of process slurry through the system, an indicating or recording flowmeter may be advantageously located on the suction side of the pump. The accurate control of the rate of flow is an important factor in permitting production of a uniformly good product. Preferably the line to the "Votator" is provided with a pressure relief valve so as to maintain a constant pressure therein.

The "Votator" is functionally a heat exchange device of such design that it provides a high ratio of surface to volume coupled with intense mixing or agitation whereby viscous or paste type material may be quickly heated. Basically, the "Votator" consists of a jacketed heat transfer tube in which is provided a mechanically driven rotator of such dimension as to leave a relatively narrow annular space between the inside of the tube and the exterior of the rotator. The rotator is provided with a plurality of scrapper blades and is adapted to be revolved at several hundred R. P. M. The heating medium is passed through the jacket on the heating tube countercurrent to the passage of the starch-paste through the annular space therewithin. Only a small amount of the starch-paste is in the "Votator" at any time and because of the high heat transfer surface coupled with the agitation and scrapping effects provided by the scrapping blades, the starch paste is brought up to the desired temperature in a relatively short period.

A number of United States patents have been issued which are directed to the "Votator" and various methods of using the same. Reference is made to United States Reissue Patent No. 22,519, reissued July 18, 1944, for a more detailed description of the construction and operation of the "Votator."

The "Votator," as used in our process, may be supplied with either water or steam as the heat transfer medium. Thus, hot water may be supplied to the "Votator" at a temperature of 190° F. in such an amount that it leaves the "Votator" at a temperature of 186° F. The starch slurry supplied to the "Votator" may have a temperature of 92° F. and is heated therein to a temperature of 190° F. The holding time of the slurry within the "Votator" may be 38 seconds.

The gelatinized and dispersed starch slurry leaves the "Votator" at a temperature of 190°–192° F. into the suction side of a positive displacement type pump, preferably having a variable speed. The first pump supplies sufficient pressure to force the starch paste or slurry to the second pump thereby permitting the latter to act as a metering pump. This arrangement tends to eliminate fluctuations in flow rate.

The second pump delivers the paste into a conversion unit or holding coil which may be in the form of a hot water jacketed pipe coil having sufficient length and capacity that it takes at least approximately 30 minutes for the hot starch paste to pass therethrough during which time it is held at a temperature of 190°–192° F. A flow rate of about 3.0 feet per minute is suitable. The conversion coil is provided with taps to obtain 20, 25, or 30 minutes holding time thereby permitting different holding times while maintaining the flow rate and enzyme content constant.

From the conversion coil, the material in process passes to the enzyme inactivator wherein the enzymatic conversion is stopped at the desired end point by heating the starch paste to a temperature of about 230° F. The inactivator may be in the form of a steam-jacketed coil heat exchanger having a pressure relief valve to provide hold-back pressure so as to maintain the inactivator coil full of starch paste. A flow velocity of one foot or more per second in the inactivator is suitable.

The converted starch paste is now ready for drying. It is preferable to dry the paste immediately after inactivation of the enzyme since upon long standing, the paste loses some of its valuable properties. However, the latter may be avoided by adding to the paste a suitable stabilizer for starch pastes, such as ammonium thiocyanate, dicyandiamide.

The converted starch paste passes from the inactivator into a jacketed surge tank, from which it is supplied onto roll dryers of known type (e. g., standard Buffalo Foundry and Machine Company unit consisting of two cast iron ground finish rolls, 2 feet in diameter and 2 feet long). This type of drying equipment has been found to produce a product having very desirable solubility and dispersion characteristics. The roll dryers operate satisfactorily when supplied with steam at 100 p. s. i. and roll speed 6–8 R. P. M. Pressures up to 150 p. s. i. may be used. The dryer may be satisfactorily operated to produce a product having an average flake thickness of 0.004 inch.

The flake from the roll dryer is ground in a mixing conveyor of known type which delivers the ground and mixed material to a scalper type reel provided with a 0.5 inch screen. From the screen the material passes into an air separator wherein the undesirable heavy material is separated from the main product. A considerable portion of the particle size reduction of the product is effected in the air separator. The coarse material from the scalper reel and the air separator are combined and returned to a reprocess tank for re-drying on the roll dryers.

Grinding of the roll-dried flake serves to reduce the bulk and improve the physical properties of the product, since the dispersion properties are dependent in part on the particle size. If the flake is not ground sufficiently fine, the rate of solution is too slow with a tendency to settle out before solution is complete. On the other hand, if the particle size is too small, there is a tendency for the product to ball instead of dispersing in water. A suitable specification for the particle size of the finished product is that 100 per cent thereof must pass a standard 30-mesh screen and a minimum of 85% must be retained on a standard 100-mesh screen.

From the air separator the product passes to a 30-mesh screen from which the coarse material is recirculated through a grinding mill, and from which the main product is discharged into suitable packaging machinery.

It will be seen that the only portion of the process described above in connection with the flow sheet which is not strictly continuous, is the preparation of the starch slurry for processing. However, an essentially continuous process is effected by the use of the two make-up tanks so that one tank can be charged while the other tank is being emptied.

The reaction end point may be determined on the basis of viscosity, and in this connection, it has been found that the viscosity of the paste from the enzyme inactivator can be used as a process control. With the process operating at equilibrium conditions, the viscosity measurements will remain essentially constant for the batch of starch processed. Equipment suitable for making this viscosity control measurement comprises a standard Scott bath and an old style Scott cup (no overflow). The orifice of the Scott cup should be $\frac{3}{16}$ inch diameter. A sample of starch paste is obtained from a sample tap positioned at the outlet of the enzyme inactivator, and 300 ml. is immediately poured into the hot Scott cup. After one minute the plug is raised and the time in seconds to collect 100 ml. of paste is measured. The desired range is 20–35 seconds when 17° Bé. starch is used, and 23–38 when 18° Bé. starch slurry is used.

Experience in operation has shown that a number of modifications may be made in the foregoing process and apparatus, and others will be apparent and occur to those skilled in the art. With respect to the apparatus used for carrying out the process, the various pieces of equipment may, in general, be selected from the conventional designs and equipment available in the market. However, it has been found that the "Votator" and the roll dryers are two pieces of equipment which are particularly adapted to the gelatinization and drying phases, respectively, of the process. However, these two pieces of equipment may be replaced with other designs which are functionally their equivalents.

Considering the process variables and effects, it has been found that the starch slurry gravities or concentrations may satisfactorily range from 17° Bé. to 19° Bé. The use of lower concentrations, among other things, increases the cost of the product by decreasing the dry solids capacity and by increasing the amount of water to be evaporated in the dehydration step of the process. The use of higher concentrations may lead to less complete dispersion of the starch, less uniform conversion and viscous masses which require abnormally high pump pressures. When process softened water is used to suspend the starch, then approximately 0.10% of calcium chloride should be added, as indicated above, to supply calcium ions which tend to enhance the activity of the enzyme, probably by stabilizing it at the high conversion temperature. If hard water is used which already contains calcium ions, the addition of calcium chloride can be reduced to 0.05%. If no calcium ion supplying material is added to the process slurry, then more enzyme will be necessary in order to obtain the same amount of conversion. The pH of the starch slurry should be within the range of 6.3–6.8, and this pH adjustment should be made prior to the addition of boric acid. Sufficient time should be allowed for mixing before a pH determination is made. The pH of the slurry will drop approximately 0.7 (e. g., from 6.5–5.8) after the addition of the boric acid, yet the final roll dried product will have a pH of approximately 6.4–6.6. The reaction or conversion will proceed outside of the preferred pH limits of 6.4–6.6, but will do so at a slower rate so that in order to obtain the same amount of conversion in the same holding time, but at a lower or higher pH value, an increased amount of enzyme must be used.

The boric acid is used in this process to improve the solution characteristics and increase the bulk density of the product. Although 7.5% (starch basis) of the boric acid has been used, it has been ascertained that this amount can be reduced to approximately 3.0%. With the lower amount of boric acid, the flake from the roll dryer contains more partially ground material so that in order to keep the amount of fines in the final product within the desired limits of approximately 15%, a screen should be used between the air separator and the grinding mill.

In the gelatinization and dispersion phase of the process, the operable temperatures range from 170° F. to 196° F. However, a range of 190–192° F. is much preferred, particularly for corn and less readily dispersible starches and when enzymes from thermophylic organisms are used, since at the lower temperatures, the range of enzyme conversion is lower and the amount of starch granule dispersion is reduced. In heating the paste within the range of 190–192° F., it has been found that the retention time of the slurry in the "Votator" may range from 29–38 seconds. When cereal alpha-amylases are used, the enzyme is rapidly inactivated at temperatures higher than 170° C., and accordingly temperatures in the lower portion of the range given are preferred for this reason.

In the conversion phase of the process, the preferred temperature for the gelatinized starch is 190° F. for corn starch, although a range of 188–192° F. is permissible when thermostable enzymes are used. The holding time in the conversion coils is preferably 30 minutes, but this factor may range from 20–30 minutes, there being a tendency for the starch to be underconverted at the lower holding period. Obviously, if more enzyme is used, the conversion time may be reduced. Advantageously the conversion coil is heated so that the paste film on the inner surface thereof is approximately two degrees higher than the main stream temperature. This feature permits the paste flow to approximate a streamline flow rather than a viscous type flow.

The enzyme inactivation phase of the process may be carried out at a temperature range of 230–290° F. At the lower temperature of 230° F., the holding time of approximately two minutes is recommended. These latter operating conditions are preferred to higher temperatures and shorter times (e. g., 290° F. at the 30 second holding time) since at the lower temperature dehydration and charring on the heat exchanging tubes are avoided.

Heat resistant enzymes of the *Bacillus mesentericus* and *subtilis* types are the most satisfactory for this process, particularly where corn starch is the raw material.

Such enzymes are commercially available under the proprietary names "Rapidase" (Wallerstein), "Amylase-A" (Wallerstein), and "Rhozyme DX" (Rohm and Hass). Experience with these has shown that the "Rhozyme DX" enzyme has a higher activity than does "Amylase-A" which is the commercially applicable form of "Rapidase."

Because of its commercial availability and importance, most of the experimental and development work has been devoted to the conversion of corn starch. However, a substantial amount of work has been done with other types of starches and it has been shown that the invention is broadly applicable to tuber and cereal starches generally. Specifically, the starches which have been found to be satisfactory for use in accordance with this invention include corn starch, wheat starch, potato starch, tapioca starch, waxy maize, rice starch and sorghum grain starch.

Of the various commercial starches available for processing in accordance with the invention, corn starch has the largest amount of linear polymer fraction. At the other end of the scale is waxy maize which consists entirely of the branched polymer fraction and has no linear polymer fraction. The other commercial starches with respect to their contents of the two different types of molecular fractions, fall intermediate between the corn starch and waxy maize. In general, it has been found that the commercial starches other than corn starch are even more receptible to processing in accordance with the invention than is the corn starch. Apparently, this is primarily due to the fact the other starches have smaller contents of the linear polymer fraction.

In the above connection, it has been found that satisfactory cold water dispersible laundry starch products can be made in accordance with the invention from starches other than corn starch with a milder or less extensive degree of conversion or modification than is required for corn starch. Experience to date indicates when corn starch is processed and uniformly converted in accordance with the invention, the enzymic conversion required to reduce the linear polymer fraction to a percentage level of about 12% and to an average chain length of DP 200-250 also converts the branched polymer fraction to approximately this same DP level. However, when other starches are used in the process which have originally a smaller percentage of linear polymer fraction, it is then possible to modify the enzymic conversion so that the DP level of the branched polymer fraction is in the neighborhood of 400-500. This may be seen from Example 3 below, the results for which are given in Table IV.

The following additional examples will serve to document a number of other successful specific embodiments of the invention, and illustrate the flexibility of the invention, particularly with respect to the types of starch and the types of enzymes that may be used. Except as otherwise noted, the embodiments covered by these additional examples were carried out in accordance with the process described under Example 1 above. The tables given hereinafter contain test data showing that the products made in accordance with the additional examples meet the specifications for an instantly cold water dispersible, cold water soluble laundry starch.

EXAMPLE 2

The process of Example 1 was successfully carried out, as described, but employing 1.0% of Amylase A enzyme in place of the 0.4% of Rhozyme DX enzyme.

EXAMPLE 3

The process of Example 1 was successfully repeated with tapioca starch with the yield of a satisfactory product.

EXAMPLE 4

The process of Example 1 was successfully repeated using tapioca starch and 1.0% of malt alpha-amylase as the enzyme with the temperature of the starch paste leaving the "Votator" and the holding temperature being 170° F. in both instances and the holding time being 15 minutes.

EXAMPLE 5

The process of Example 1 was successfully repeated using waxy maize starch.

EXAMPLE 6

The process of Example 1 was satisfactorily repeated using tapioca starch and 1.0% Amylase A enzyme.

Cold water dispersible laundry starch made in accordance with the present invention is evaluated both in accordance with certain standard testing and analyzing procedures, as well as by performance comparison with a commercial standard laundry starch which may be taken as representative of currently available commercial laundry starch products. The testing values and factors used for evaluating the products of this invention include the following:

Intrinsic viscosity
    Alkali lability value
    Iodine affinity
    Cold water dispersibility
    Cold water solubility
    Reducing sugars content
    Flexometer sizing value Intrinsic viscosity determinations are made as follows:

For any type of A-fraction: 2.50 g. (calculated on dry basis by separate moisture determination) of the material is transferred to a clean dry 400 ml. beaker. Approximately 100 ml. of water is quickly added, and the mixture immediately and vigorously stirred with a metal propellor-type agitator, to give a suspension of small gel particles without any major lumps. 100.0 ml. of exactly 5 N KOH is then added via pipette, and the mixture stirred for 30 minutes, which usually suffices to give complete solution. Previous tests have shown that viscosity in alkaline medium drops uniformly over a period of days. Consequently, no precautions are taken to prevent entry of $CO_2$ or oxygen during the solution period. Instead, attention is devoted primarily to rapidity, to dissolve the sample within 30 minutes and to measure viscosity at all dilutions within 3–4 hours. The solution is then transferred to a 500 ml. volumetric flask and made up to mark with water. This gives an 0.5% solution of A-fraction and 1 N KOH. Accurate dilutions are made to 0.35%, 0.25%, 0.2%, 0.15% and 0.1%, using standard 1 N KOH for dilution. Viscosity is determined at each concentration with a Cannon-Fenske No. 100 pipette, maintained in a thermostated bath at 35.0°±0.2° C. Flow time is determined to a precision of ±0.05 second (average deviation from the mean), filling the viscometer at least twice, and running at least three flow times for each filling.

For any type of B-fraction: 2.50 g. (D. B.) of the B-fraction is quantitatively sifted into 200–300 ml. of cold water in a 400 ml. beaker, stirring vigorously to avoid lumping. The beaker is heated in a boiling water bath for 30 minutes, then allowed to cool to room temperature, stirring being continued throughout the heating and cooling periods. Surface evaporation causes insoluble skins on the side of the beaker; this is minimized by stirring through a perforated watchglass cover during the heating and cooling periods. 100.0 ml. of 5 N KOH is then added, the solution made up to 500 ml. with water, and viscosities determined as described for the A-fraction.

The 1 N and 5 N KOH solutions should be standardized by titration against potassium acid phthalate, and adjusted within 1% of the stipulated values (i. e., 0.99–1.01 N, 4.95–5.05 N, respectively). Otherwise, large errors will be introduced by variations in flow time of the solvent, since the viscosity of KOH varies markedly with concentration (e. g., flow time of 0.896 N, 1.0005 N and 1.149 N KOH=61.8, 62.6 and 63.3 seconds, respectively). As a further test, the flow time of the 1 N KOH is determined daily, and the 5 N KOH is diluted to 1 N and similarly checked viscometrically at periodic intervals.

In order to minimize association effects, the limiting or intrinsic viscosity ($\eta$) is determined in the following manner. The specific viscosity ($\eta$ sp.) relative to 1 N KOH is determined for each concentration $$\eta \, sp. = \frac{\text{flow time of solution} - \text{flow time of 1 N KOH}}{\text{flow time of 1 N KOH}}$$

then the value of $\eta$ sp./concentration is plotted against concentration. The relationship will be linear for concentrations of A-fraction as high as 1%; with the B-fraction the plot will curve upwards above 0.25%. The linear portion of the curve is extrapolated to zero concentration to give the intrinsic viscosity. Determined by the methods here described, this latter value is independent of the state of aggregation of the sample. Thus, completely retrograded A-friction is found to have the same intrinsic viscosity as the nonretrograded material. Similarly, the methods of solution employed for the B-fraction eliminate any history of coacervation.

Alkali lability value or number determinations are made in accordance with the procedure described by T. J. Schoch and Jensen, "Industrial and Engineering Chemistry," volume XII, page 231 (1940).

Iodine affinity determinations are made in accordance with the procedure described by F. L. Bates, D. French and R. Rundle, "Journal American Chemical Society," volume 65, page 142 (1943). The iodine affinity determination results are expressed as the per cent of iodine, by weight, bound by the starch sample.

Cold water dispersibility measurements are made as follows:

Weigh 100 grams of cold water dispersible starch into a dry container. Measure two liters of cold water in a 3-liter beaker. Stir the water with one hand and sprinkle the starch into the water with the other hand over a period of two minutes. Continue the hand stirring for two minutes and observe whether the starch has wetted readily and dispersed quickly. Then pour the solution over a 60-mesh screen and observe whether there are undispersed lumps present. Record the results as "poor," "fair," "good" or "excellent."

Cold water solubility determinations are made as follows:

Weigh accurately a two gram sample of cold water dispersible starch and transfer it carefully to a dry 200-ml. centrifuge bottle. Add exactly 99.0 ml. of distilled water from a calibrated 100 ml. volumetric flask and shake vigorously as soon as the water comes in contact with the starch. Stopper the bottle and shake mechanically for 15 minutes. Transfer the centrifuge cup containing the sample to a centrifuge and centrifugate for 15 minutes at approximately 2000 R. P. M. Pipet accurately a 25 ml. aliquot of the supernatant solution into a dry, tared nickel or silica dish. Evaporate the sample to dryness on a steam bath or in an air oven at 100° C. Complete drying by placing the sample in a vacuum oven at 105° C. for 4 hours. Remove sample from oven, cool in desiccator and weigh.

Calculation:

$$\text{Percent soluble (d. b.)} = \frac{\text{Residue weight} \times 100}{\text{Sample weight (2 g.)} \times \text{d. s.}}$$

Reducing sugars determinations are made in accordance with the procedure of Schoorl, "Sugar Analysis" by Browne and Zerban, 3rd edition, page 829, published by Wiley and Son, New York (1941).

Flexometer sizing value determinations are made as follows:

*Materials and equipment*

(1) Schiefer Flexometer and accessories.[1]
(2) Electric mangle.
(3) Mechanical wringer.
(4) Storage space at constant temperature and humidity.
(5) Loosely woven cotton fabric such as muslin, longcloth or cambric (approximately 0.010 inch thick and of a thread count of approximately 50/50).
(6) Pabst "Ex-Size" for desizing the material.
(7) Reference standard (commercial laundry starch prepared in crystal form by drying 60-fluidity, acid-modified corn starch).

*Preparation of material.*—Desize the material by soaking overnight in a solution containing 10 ml. of Pabst "Ex-Size" per liter of solu-

[1] "The Flexometer, An Instrument for Evaluating the Flexural Properties of Cloth and Similar Materials," by H. F. Schiefer, Research Paper No. 555, Bureau of Standards Journal of Research, vol. 10, pages 647–57 (1933).

tion. Wash the desized material through two sets of soapsuds and rinse with water five times, using distilled water for the last rinse. If the desized sample is dry, immerse in distilled water and put through the wringer just before sizing. The cloth should be torn into test strips 36 inches long and 6 inches wide before sizing.

*Preparation of sizing solutions. — Reference standard.*—Weigh 20 g. of reference standard starch into a 1 liter beaker and add 450 ml. of distilled water. NOTE.—Stir the mixture until the starch is suspended and place the suspension over a Bunsen or Fischer burner. Stir continually until the starch is gelatinized and bring the solution to a boil. Boil for four minutes. Cool the solution to room temperature (70–78° F.) and adjust the net weight to 500 g. Stir the solution and cover until ready to use.

*Cold water dispersible, cold water soluble starch sample.*—Weigh 20 g. of cold water dispersible, cold water soluble starch into a 1 liter beaker. Add 480 ml. of distilled water at room temperature (70–78° F.) and stir vigorously as the water comes in contact with the starch. Mix three minutes with a mechanical stirrer and inspect the solution for undissolved particles. If necessary, mix until no undissolved lumps remain. Cover the solution until ready for use.

NOTE.—If it is desired to test solutions on a dry substance basis rather than a commercial basis, weigh out a sample equivalent to 20 g. of dry solids and add sufficient distilled water to make a total weight of 500 g. This technique is recommended when the samples are subject to large variations in moisture.

*Sizing the fabric.* — The cotton fabrics (6" x 36") which have been previously dipped in distilled water are put through the wringer. If not used immediately, they are kept in a covered beaker. Immerse the test samples in the starch solution and stir for one minute. Allow the sample to remain in the starch solution for two additional minutes. Adjust the pressure on the rolls of the wringer and do not change this pressure setting while running a series of samples. Wipe the wringer rolls with a desized towel wrung from distilled water after each starched sample is wrung through. Now put the sample through the wringer and place in a covered beaker until ready for ironing.

Heat the electric mangle until the temperature reaches 450° F. Put a desized cloth over the mangle roll and iron until dry and leave in position. Now iron the sample until it is dry; two or three revolutions are usually sufficient. Each sample must be ironed on a freshly desized cover over the mangle roll. The ironed samples are then conditioned at least twelve hours in the constant temperature room (73° F. and 50% relative humidity).

The sample is then cut into strips two inches by six inches which are tested with a flexometer.

*Measurement and calculation.*—A test strip is placed on the mounting block and clamped in position. The mounting clamps are then affixed with Canada balsam. The specimen is removed from the block and the excess material is cut off, leaving the sample two inches by four inches. Sixteen such specimens are prepared from each sample. The specimens are mounted on the flexometer and the spring deflection is determined as outlined below. The average result obtained on eight such pairs of samples is the spring deflection for the sample.

After the samples are mounted on the flexometer, the movable plate is rotated to lower scale reading of 10. The upper scale reading is noted and recorded. The upper scale reading minus the lower scale reading is the instrument blank. Now the movable plate is rotated to lower scale reading of 72 over a period of ten seconds. The movable plate is held at this reading until 30 seconds have elapsed and then the upper scale reading is noted and recorded, while the lower scale is held at a reading of 72. The difference between the upper scale reading and the 72 minus the instrument blank is called the spring deflection at a folding angle of eight degrees. The deflections for Reference standard starch and cold water dispersible, cold water soluble starch are then compared and the stiffness of cold water dispersible, cold water soluble starch is expressed in terms of the Reference standard.

$$\text{Percent stiffness (relative to Reference standard)} = \frac{\text{Cold water dispersible, cold water soluble starch spring deflection} \times 100}{\text{Reference standard spring deflection}}$$

| Sample Calculation | | | |
|---|---|---|---|
| Reference Standard | | Cold Water Dispersible, Cold Water Soluble Starch | |
| Lower Scale | Upper Scale | Lower Scale | Upper Scale |
| 10 | 12.2 | 10 | 12.2 |
| 72 | 86.2 | 72 | 87.4 |

Reference standard spring deflection _____ =12.0
Cold water dispersible, cold water soluble starch spring deflection _____ =13.2

$$\text{Percent stiffness (relative to reference standard)} = \frac{13.2 \times 100}{12} = 110\%$$

The satisfactory range for per cent stiffness of cold water dispersible, cold water soluble laundry starch is 90–100.

In addition to the foregoing determinations and values or specifications, reference is made in the present specification to fluidity values, molecular weights, and fractionation of starch into two types of fractions. These values and procedures are determined and effected as follows:

Molecular weights (or degree of polymerization, DP) determinations are made in accordance with the procedure described by F. C. Cleveland and R. W. Kerr, "Cereal Chemistry," March 1948. Fractionation of starch into linear branched polymers is carried out in accordance with the procedure described by T. J. Schoch in "Journal of the American Chemical Society," volume 64, page 2957 (1942).

Fluidity determinations are made in accordance with the method described in "Chemistry and Industry of Starch," R. W. Kerr, New York (1944), page 95.

The following table contains data whereby a comparison may be made between the various chemical and performance characteristics of (1) a representative cold water dispersible laundry starch made in accordance with the present invention from corn starch as described above in Example 1, and (2) five samples of acid modified starches:

TABLE I

| Starch Sample | Chemical Properties | | | | | Physical Properties | | | | |
|---|---|---|---|---|---|---|---|---|---|---|
| | Yield of Fraction Percent | $DP_n$ | Intrin. Visc. in N KOH | Alkali Lability No. | Iodine Affinity | Cold Water Dispersibility | Cold Water Solubility | Reducing Sugars Percent | Flexometer Sizing Value | Remarks on Starched Fabrics |
| Corn starch converted with "Rhozyme-Dx": | | | | 24.0 | 3.31 | Excellent | 94.5 | 0.88 | 98 | Excellent Finish |
| Linear Fraction | 11.5 | 225 | 0.49 | 34.1 | | | | | | |
| Branched Fraction | | 225 | 0.34 | 21.6 | | | | | | |
| Unmodified corn starch roll gelatinized: | | | | | 5.30 | Very poor | 8.04 | 0.17 | 180 | Harsh Spotted Finish |
| Linear Fraction | 28.0 | 445 | 1.20 | 22.9 | | | | | | |
| Branched Fraction | | 2300 | 1.25 | 4.9 | | | | | | |
| Acid modified corn starch 20 fluidity roll gelatinized: | | | | | 5.50 | Poor | 22.5 | 0.16 | 163 | Uneven Finish |
| Linear Fraction | 32.7 | 640 | 1.12 | 18.8 | | | | | | |
| Branched Fraction | | 2010 | 0.90 | 7.8 | | | | | | |
| Acid modified corn starch 60 fluidity roll gelatinized: | | | | 16.5 | 3.71 | | | | | |
| Linear Fraction | 32.4 | 490 | 0.82 | 22.8 | | | | | | |
| Branched Fraction | | 630 | 0.63 | 11.4 | | | | | | |
| Acid modified corn starch 75 fluidity roll gelatinized: | | | | 21.7 | 3.31 | Poor | 71.0 | 1.5 | 117 | Very spotted finish—slight sticking of iron |
| Linear Fraction | 34.6 | 370 | 0.60 | 31.8 | | | | | | |
| Branched Fraction | | | 0.43 | 15.1 | | | | | | |
| Acid hydrolyzed corn starch 95 fluidity dried on rolls: | | | | 58.9 | 1.80 | Good | 97.7 | 7.01 | 71 | Weak-iron sticks |
| Linear Fraction | 11.6 | 81 | 0.14 | 69.4 | | | | | | |
| Branched Fraction | 78.5 | 87 | 0.07 | 58.4 | | | | | | |

The data contained in Table I show that in acid conversion of starch, the acid attack on the molecules is very irregular, so that even at the 60 fluidity level the linear polymer fraction is still of substantially the same molecular weight as it is in the unmodified starch sample tested. Furthermore, the data show that the percentage of linear polymer fraction remains substantially the same in acid modified starch as in the unmodified starch up through the 75 fluidity level. On the other hand, in the sample which was enzyme converted in accordance with this invention, the molecular weight of the linear fraction was uniformly reduced to about one-half its original value and it was reduced more than one-half in percentage present.

The data in Table I further show that it was only when starch was gelatinized and partially hydrolyzed with acid and converted to the 95 fluidity level, that it had acceptable cold water dispersibility and solubility, but such a product had an excessive reducing sugars content, a rather low sizing value and did not give a good finish on fabric sized therewith.

Reference was made above to the fact that cold water soluble starch products had previously been made by dextrinizing starch. Table II contains data showing the characteristics of such products made by dextrinizing neutral corn starch in the dry state at 150–175° C. None of the dextrinized products was a satisfactory product in terms of the present invention. In this type of conversion sizing value is lost before a satisfactory degree of cold water solubility is attained.

TABLE II

| Dextrinization Time, Hours | Linear Polymer Percent | Intrinsic Viscosity in N KOH | Iodine Affinity (Percent Iodine) | Reducing Sugars, Percent | Cold Water Dispersibility | Cold Water Solubility, Percent | Sizing Value By Flexometer (100 is Standard) |
|---|---|---|---|---|---|---|---|
| 2.0 | 11.5 | 0.19 | 2.20 | 0.83 | Poor | 37.6 | 83 |
| 3.0 | 9.1 | 0.15 | 1.75 | 1.03 | do | 68.4 | 76 |
| 4.3 | 5.0 | 0.11 | 1.00 | 1.31 | Fair | 96.2 | 83 |

Tables III, IV and V contain data showing the effects of variations in (a) enzyme source, (b) type of starch, and (c) time of enzyme conver-

TABLE III

*Effect of variation in enzyme source for conversion in enzymic process*

| Conversion Variables | | | | | | Inspection of Starch | | | | | | | | | | |
|---|---|---|---|---|---|---|---|---|---|---|---|---|---|---|---|---|
| | | | | | | Linear Polymer | | | Branched Polymer | | | Whole Starch | | | | |
| Enzyme | pH of Slurry | Amt. Enzyme as Percent Starch | Holding Time, Min. | Holding Temp. | Type of Starch | Per Cent of Starch | $DP_n$ | Alkali Lability | Intrin. Visc. | $DP_n$ | Alkali Lability | Intrin. Visc. | Alkali Lability | Intrin. Visc. | Reducing Sugars, Per Cent | Cold Water | | Flexometer Size Value |
| | | | | | | | | | | | | | | | | Dispers. | Sol. Per Cent | |
| Rhozyme DX | 6.5 | 0.4 | 27 | 190 °F | Corn | 11.5 | 255 | 34.1 | 0.49 | 255 | 21.6 | 0.34 | 24.0 | 0.36 | 0.88 | Excellent | 94.5 | 98 |
| Amylase A | 6.7 | 1.0 | 30 | 190 | do | 10.7 | 240 | 36.1 | 0.47 | 355 | 17.3 | 0.39 | 21.2 | 0.45 | 0.84 | do | 95.5 | 89 |
| Amylase A | 6.7 | 1.0 | 9 | 190 | Tapioca | 6.3 | 175 | 51.0 | 0.33 | 420 | 13.2 | 0.55 | 17.6 | 0.48 | 1.00 | do | 99.9 | 93 |
| Malt Alpha Amylase | 6.3 | 1.0 | 27 | 170 | do | 6.3 | 150 | 52.1 | 0.29 | 265 | 23.9 | 0.36 | 27.0 | 0.37 | 3.10 | do | 96.6 | 90 | sion, respectively, in practicing the present invention. Tables III and IV represent the results of experiments described in Examples 2, 3, 4, 5 and 6. Table V illustrates the effect of the time variable, using all other conditions as stated in Example 1.

TABLE IV

*Effect of variation of starch type in enzymic process, using 0.4% Rhoxyme DX enzyme*

| Type of Starch | Holding Time, Min. | Characteristics of Fractions ||||||| Characteristics of Starch ||||||
|---|---|---|---|---|---|---|---|---|---|---|---|---|---|---|
| | | Linear Polymer |||| Branched Polymer |||  Alkali Lability Value | Intrin. Visc. in N KOH | Reducing Sugar Percent | Cold Water Dispersibility | Cold Water Soluble, Percent | Sizing Value (100 is Standard) |
| | | Percent of Starch | $DP_n$ | Alkali Lability Value | Intrin. Visc. in N KOH | $DP_n$ | Alkali Lability Value | Intrin. Visc. in N KOH | | | | | | |
| Corn | 27 | 11.5 | 255 | 34.1 | 0.49 | 255 | 21.6 | 0.34 | 24.0 | 0.36 | 0.88 | Excellent | 94.5 | 98 |
| Tapioca | 15 | 12.1 | 225 | 38.6 | 0.45 | 430 | 13.5 | 0.55 | 17.5 | 0.54 | 0.52 | do | 99.1 | 103 |
| Waxy Maize [1] | 27 | 10.0 | | | | 260 | 20.9 | 0.31 | 20.9 | 0.31 | 1.40 | do | 100.0 | 107 |

[1] This starch is all branched polymer.

TABLE V

*Effect of variation in time of enzyme conversion in enzymic process (corn starch) +0.4% Rhozyme DX enzyme*

| Conversion Time, min. | Intrinsic Viscosity in N KOH | Alkali Lability Value | Iodine Affinity (Percent Iodine) | Cold Water Dispersibility | Cold Water Soluble, Percent | Sizing Value by Flexometer (100 is Standard) |
|---|---|---|---|---|---|---|
| 10 | 0.57 | 17.5 | 4.4 | bad | 80.9 | 109 |
| 27 (normal) | 0.35 | 24.0 | 3.3 | excellent | 94.5 | 98 |
| 45 | 0.28 | 27.0 | 3.1 | good | 98.3 | 94 |

What is claimed as new is:

1. The method of making readily cold water dispersible, cold water soluble laundry starch in dry form which comprises, preparing an aqueous slurry of starch, subjecting said slurry to simultaneous hot water gelatinization and mechanical disruption in colloidal solution at a temperature at least as high as the normal gelatinization temperature of the starch, so as to obtain a dispersion of substantially all of the starch molecules, enzyme converting said starch at elevated temperature with an enzyme characterized by its ability to hydrolyze starch molecules at elevated temperature into relatively large, substantially non-reducing segments, inactivating the enzyme, and drying the starch solution to a dry product.

2. The method of claim 1 wherein said enzyme conversion follows immediately after said gelatinization and mechanical disruption and without intermediate cooling.

3. The method of claim 1 wherein said enzyme conversion proceeds to such a degree that the resulting starch product has a content of not more than approximately 12% by weight of linear polymer with an average degree of polymerization not exceeding approximately 250, and a branched polymer content having an average degree of polymerization not less than approximately 200, the branched polymers having a relatively narrow range of degree of polymerization.

4. The method of claim 1 wherein the enzyme is selected from the group consisting of amylases from thermophylic organisms and cereal alpha amylases.

5. The method of claim 1 wherein said enzyme conversion is carried out in the presence of calcium ions.

6. The method of claim 1 wherein boric acid and calcium chloride are incorporated in said starch slurry.

7. The method of claim 1 wherein said starch slurry has a concentration of at least 15° Bé.

8. The method of claim 1 wherein said starch is corn starch and said starch is both gelatinized and disrupted, as well as immediately thereafter enzyme converted, at a temperature of at least approximately 190° F.

9. The method of making cold water dispersible laundry starch which comprises preparing a slurry of starch having a gravity of about 17–19° Bé, containing approximately 0.1% $CaCl_2$ dry starch basis, having the pH of the slurry adjusted to about 6.4–6.8 by addition of soda ash, and containing approximately 3.0–7.5% by weight of boric acid dry starch basis added after said pH adjustment and approximately 0.4–1.0% dry starch basis of a starch-liquefying amylase derived from thermophylic organisms; gelatinizing and molecularly dispersing said slurry at a temperature of approximately 190–192° F. in approximately 29–38 seconds under an intense degree of agitation and shearing action; maintaining the gelatinized and dispersed slurry at a temperature of about 190° F. for a period of 20–30 minutes and sufficient to enzyme-convert the same at least to the point where the linear polymer fraction, if present, does not exceed approximately 12% by weight with an average degree of polymerization not exceeding approximately 250, and where the branched polymer content has an average degree of polymerization not less than approximately 200 and the branched polymers have a relatively narrow range of degree of polymerization; inactivating the enzyme in the converted slurry by heating the latter to a temperature of about at least 230° F.; and drying the converted slurry.

10. The method called for in claim 9 wherein said converted solution is dried on drying rolls.

11. The method called for in claim 9 wherein corn starch is used to prepare said slurry and said enzyme utilized for conversion is prepared from Bacillus mesentericus.

12. The method called for in claim 9 wherein corn starch is used to prepare said slurry and said enzyme utilized for conversion is prepared from Bacillus subtilis.

13. The method according to claim 1 wherein the drying step is carried out immediately after inactivation of the enzyme.

14. The method of claim 1 wherein 3 to 7.5% by weight of boric acid, dry starch basis, is incorporated in said starch slurry.

15. The product made in accordance with the process of claim 1.

WILLIAM WARD PIGMAN.
RALPH W. KERR.
NORBERT F. SCHINK.

REFERENCES CITED

The following references are of record in the file of this patent:

UNITED STATES PATENTS

| Number | Name | Date |
|---|---|---|
| Re. 22,519 | Miller et al. | July 18, 1944 |
| 1,677,615 | Boidin et al. | July 17, 1928 |
| 2,105,052 | Oltmans | Jan. 11, 1938 |
| 2,148,016 | Gale | Feb. 21, 1939 |
| 2,258,741 | Champion et al. | Oct. 14, 1941 |
| 2,266,051 | Lebeson | Dec. 16, 1941 |
| 2,319,637 | Shopmeyer et al. | May 18, 1943 |
| 2,364,590 | Shopmeyer et al. | Dec. 5, 1944 |
| 2,380,848 | Kerr | July 31, 1945 |
| 2,417,969 | Caesar et al. | Mar. 25, 1947 |
| 2,424,050 | Pecker et al. | July 15, 1947 |
| 2,433,285 | Marrone et al. | Dec. 23, 1947 |

OTHER REFERENCES

Kerr, Paper Trade Journal, December 3, 1942, pages 30–34.

Ind. & Eng. Chem., November 1943, pages 1169–1172, by Wallerstein.

The Merck Index, 5th ed., 1940, page 529.